Patented Feb. 2, 1937

2,069,687

UNITED STATES PATENT OFFICE 2,069,687

PROCESS FOR THE PARTIAL HYDROLYSIS OF CARDIO-ACTIVE DIGITALIS GLUCOSIDES AND PRODUCTS OBTAINED THEREBY

Arthur Stoll, Walter Kreis, and Albert Hofmann, Basel, Switzerland, assignors to firm "Chemical Works Formerly Sandoz", Basel, Switzerland No Drawing. Application July 19, 1933, Serial No. 681,220. In Switzerland July 22, 1932

15 Claims. (Cl. 260—25)

The present invention relates to a process allowing a partial hydrolysis of cardio-active digitalis-glucosides and to the products obtainable thereby.

W. A. Jacobs and A. Hoffmann (Journ. Biol. Chemistry 69, 153–163, 1926 and Chem. Zentralblatt 1927, I, page 294) have shown that it is possible to split K-strophantin into cymarin and glucose by means of a ferment. This ferment (strophantobiase) splits off the glucose contained in strophantin and possesses an absolutely specific action.

It has now been found that digitalis (e. g. digitalis purpurea, digitalis lanata) species contain enzymes, which are able of partially hydrolyzing the cardio-active glucosides contained in these drugs and to split off the glucose contained in the glucoside molecule.

An object of the present invention is, therefore, a process for the elimination of glucose from the glucoside molecule by means of a treatment of the glucosides with a ferment contained in the drug.

The ferments used for this purpose are commonly called enzymes and are contained in the fresh or in the carefully dried drug. The hydrolysis by means of enzymes is called zymolysis (enzyme hydrolysis). The hydrolyzing action of the enzymes on the glucosides is generally specific, this meaning that they possess a hydrolyzing action especially appropriated for eliminating the glucose from the molecule of the co-existing glucosides. But certain enzymes are able of hydrolyzing glucosides extracted from another species of digitalis or scilla. This is not a general property of the ferments, which can be shown by the following examples. It was for example impossible to hydrolyze a genuine glucoside from digitalis lanata with the enzyme extracted from scilla maritima. But it is possible to hydrolyze scillaren A with the enzyme of digitalis lanata. It is true that in such case the zymolysis is not going very easily, but the fact that the hydrolysis takes place is of a very great scientifical value.

Another object of the present invention is to provide a process for the preparation of cardioactive glucosides that are free from glucose; this process consists in the treatment of glucosides containing glucose, with enzymes.

Another object of the invention is a process for the treatment of glucosides contained or extracted from digitalis and containing glucose in their molecule, with enzymes contained in the dry or fresh drugs or with enzyme preparations.

Another object of the invention are the methods for the treatment of glucosides for the purpose of eliminating one molecule of glucose, these methods being characterized in that the zymolysis is applied on fresh drugs or on pure glucosides or glucosides containing inert impurities or mixtures of several glucosides.

Another object of the invention is the manner in which the zymolysis is carried out, which treatment can be carried out in presence of water and of suitable organic compounds miscible with water and in the case where fresh drugs are used in presence of compounds capable of killing the living cellules of the fresh drug and to arrest the putrefaction.

Still another object of the invention are the new glucosides of digitalis that are free from glucose and possess very valuable cardio-active properties and are useful for therapeutic applications.

Still another object of the invention are the acetylated glucosides of digitalis lanata free from glucose, possessing very valuable cardio-active properties and that may be used for therapeutical applications.

The present process allows therefore to transform cardio-active glucosides containing glucose into glucosides that are free from glucose.

In order to carry out the present process, the glucosides of digitalis are subjected to the action of enzymes.

The enzymatic hydrolysis (zymolysis) of the glucosides can be performed with such glucosides that contain a glucose molecule and that may further contain acetyl groups.

Such glucosides are for example the genuine glucosides of digitalis purpurea or the desacetylated glucosides of digitalis lanata. As acetylated glucosides the genuine glucosides of digitalis lanata may be used.

The starting materials may be purified before the treatment with the enzymes, or their hydrolysis can be carried out in the drug containing them. Therefore, it is possible to carry out the present process with glucosides contained in the plants, and to isolate the hydrolyzed products by any known methods, of which some are described below in detail.

The zymolysis can be carried out with aqueous solutions or suspensions of the glucosides in presence of suitable solvents. The aqueous solutions may further contain organic compounds miscible with water, for example methanol, ethanol, acetone, dioxane, glycolmethylether and the like.

By working with fresh drugs containing the glucosides, it is preferable to carry out the zymolysis in presence of such compounds that are able to kill the cellules of the fresh drug and to arrest the putrefaction process. Such compounds are for example ethyl acetate, chloroform toluene, methanol, ethanol and the like.

The zymolysis can be carried out at a low temperature, or at elevated temperatures where the enzymes are not destroyed and their action is not arrested. Preferably the hydrolysis process is carried out at room temperature or for instance at temperatures of 10°–50° C.

In order to carry out the present process, the glucosides are subjected to the action of enzymes contained in the raw drug, or to the enzyme preparation, prepared from the drug by any usual process. An example showing the preparation of an active extract rich in enzymes is given below.

As it has been found, the enzymes act on the glucosides and split off the molecule of glucose contained therein. Therefore, the obtained products are free from glucose.

By subjecting the desacetylated glucosides A, B and C of digitalis lanata, obtained by alkaline treatment of the genuine glucosides A, B and C to the action of the enzyme contained in digitalis purpurea, glucosides free from glucose are obtained.

By subjecting the genuine glucosides A, B and C prepared as described in U. S. Patent 1,923,491 to the action of enzymes, quite new glucosides still containing an acetyl group, but no glucose, are obtained.

For instance the genuine glucoside A of digitalis lanata is transformed by the action of the enzymes into a glucoside which crystallizes from diluted ethanol in form of rectangular plates. It is easily soluble in methanol, ethanol and chloroform, very difficultly soluble in ether and is practically insoluble in water. It contains about 63 to 64% of C and 8 to 8.5% of H. On lactone titration 0.76 g. of it necessitate 1.9 cc. of $$\tfrac{1}{10}\text{-}n$$

sodium hydroxide solution, which shows, that its molecular weight must be of about 800. By acid hydrolysis it gives about 46% of the aglucone (digitoxigenin), about 55% of digitoxose and about 7.5% of acetic acid. The hydrolysis takes place according to the following formula:

$$C_{43}H_{66}O_{14} + 4H_2O = C_{23}H_{34}O_4 + 3C_6H_{12}O_4 + C_2H_4O_2$$
digitoxi-  digitoxose  acetic
genin                      acid By careful treatment with dilute alkaline solutions, it is possible to eliminate the acetyl group, whereby digitoxin is obtained according to the following formula:

$$C_{43}H_{66}O_{14} + NaOH = C_{41}H_{64}O_{13} + CH_3COONa$$
digitoxin

By Keller-Kiliani's color reaction (consisting in underlaying with concentrated sulphuric acid a solution of 2–3 mg. of the product in 5 cc. of glacial acetic acid to which one drop of iron chloride solution 1:20 has been added) the new glucoside gives in the sulphuric acid a brown zone, whereas in glacial acetic acid a blue to green-blue coloration, characteristic for digitoxose, is obtained.

The genuine glucoside B of digitalis lanata is transformed by the action of the enzymes into a glucoside that crystallizes from diluted ethanol in form of rectangular plates. It is soluble in methanol and ethanol, difficultly soluble in chloroform, very difficultly soluble in ether and is practically insoluble in water. It contains about 62.1 to 62.8% of C and 7.8 to 8.3% of H. On lactone titration 0.114 g. of it necessitates 2.7 cc. of $$\tfrac{N}{10}$$

sodium hydroxide solution, which shows that its molecular weight must be of about 842. By acid hydrolysis it gives about 47% of aglucone (gitoxigenin), about 54% of digitoxose and about 7% of acetic acid. The hydrolysis takes place according to the following formula:

$$C_{43}H_{66}O_{15} + 4H_2O = C_{23}H_{34}O_5 + 3C_6H_{12}O_4 + C_2H_4O_2$$
gitoxi-  digitoxose  acetic
genin                     acid By careful treatment with dilute alkaline solutions, it is possible to eliminate the acetyl group, whereby gitoxin is obtained according to the following formula:

$$C_{43}H_{66}O_{15} + NaOH = C_{41}H_{64}O_{14} + CH_3COONa$$
gitoxin

By Keller-Kiliani's color reaction the new glucoside gives in sulphuric acid a red zone, whereas in glacial acetic acid a blue to green-blue coloration, characteristic for digitoxose, is obtained.

The genuine glucoside C of digitalis lanata is transformed by the action of the enzymes into a glucoside that crystallizes from diluted ethanol in form of rectangular plates. It is easily soluble in methanol and ethanol, difficultly soluble in chloroform and very difficultly soluble in ether. It is practically insoluble in water. It contains about 62.0 to 62.8% of C and 7.8 to 8.3% of H. On lactone titration 0.192 g. of it necessitates 4.4 cc. of $$\tfrac{N}{10}$$

sodium hydroxide solution, which shows that its molecular weight must be of about 854. By acid hydrolysis it gives about 47% of aglucone (digoxigenin), about 54% of digitoxose and about 7% of acetic acid. The hydrolysis takes place according to the following formula:

$$C_{43}H_{66}O_{15} + 4H_2O = C_{23}H_{34}O_5 + 3C_6H_{12}O_4 + C_2H_4O_2$$
digoxi-  digitoxose  acetic
genin                     acid By careful treatment with dilute alkaline solutions it is possible to eliminate the acetyl group whereby digoxin is obtained according to the following formula:

$$C_{43}H_{66}O_{15} + NaOH = C_{41}H_{64}O_{14} + CH_3COONa$$
digoxin

By Keller-Kiliani's color reaction the new glucoside gives in sulphuric acid a brown zone, whereas in glacial acetic acid a blue to green-blue coloration, characteristic for digitoxose, is obtained.

The following examples, without being limitative, illustrate the present process and the manner in which it can be realized, the parts being by weight:

Example 1

10 parts of fresh leaves of digitalis purpurea are cut to small pieces, introduced into ethyl acetate and allowed to stand for 3–4 days, whereby the enzyme contained in the drug acts on the glucosides. After this period of action, ethyl acetate is separated, 8 parts of finely pulverized ammonium sulphate are added to the mass, thoroughly mixed and the mixture pressed out.

The residue is exhausted with ethyl acetate, which has been previously used. The ethyl acetate extract is filtered and evaporated in vacuo to dryness. The residue is extracted with ether, whereby digitoxin becomes solubilized.

After filtration, the etheric solution is evaporated in vacuo and the residue washed with petroleum ether. The remaining part is dissolved in 2 parts of a water-methanol mixture 1:1 and treated with an insoluble compound capable of precipitating the tannic principles. The solution is then filtered again and methanol present therein evaporated in vacuo. During this operation raw digitoxin precipitates out, is filtered and taken up in a small quantity of methanol, whereby digitoxin partially precipitates in form of a white precipitate. This part is separated and recrystallized from an ethanol-water mixture.

By adding water to the methanol containing mother-lye a further portion of digitoxin can be precipitated, if necessary purified by reprecipitation from chloroform by means of petroleum ether and a treatment with substances precipitating tannins. If desired, the products can be decolored by means of a treatment with animal coal and recrystallized from diluted ethanol.

If the extraction of the drug with ethyl acetate in presence of ammonium sulphate is carried out rapidly, that is without allowing it to stand, no digitoxin will be obtained, but a glucoside preparation which contains a greater amount of sugar. This last glucoside is transformed into digitoxin by the enzyme contained in the drug, during standing of the ethyl acetate solution containing the leaves of digitalis purpurea. Until now it was not known that digitoxin is a product obtained by elimination of glucose by means of an enzyme.

If fresh leaves of digitalis lanata are subjected to the process described above, that is if they are allowed to stand for a certain period of time, the corresponding glucosides free from glucose can be isolated from the drug.

Example 2

Two parts of dried and pulverized leaves of digitalis lanata are introduced into 10 parts of ethyl acetate, mixed with 8 parts of water and the mixture allowed to stand for 5 days, whereby the enzymatic splitting takes place. To the mixture there are then added 7 parts of finely pulverized ammonium sulphate and the mass is pressed out. The obtained residue is exhausted with ethyl acetate, the obtained solution filtered and completely evaporated in vacuo. The residue is then exhausted with 2-3 parts of ether, whereby the new glucosides are dissolved. After filtration the etheric solution is completely evaporated in vacuo and the residue so long washed with petroleum ether, until the latter remains completely colorless. The remaining part is then dissolved in 2 parts of a water-methanol mixture 1:1 and treated with insoluble tannin-precipitating substances. After filtration, the solution is freed from methanol by evaporation in vacuo, whereby the raw mixture of partially hydrolyzed glucosides precipitates out. The precipitate is then separated from the solution and purified by crystallization from ethanol. The product obtained is a mixture of glucose-free genuine glucosides of digitalis lanata.

If in the present process, the action of the enzyme is made impossible by means of an addition of an enzyme poison or of a precipitating agent like ammonium sulphate, only the genuine glucosides which may be prepared according to Example 3 of the U. S. Patent No. 1,923,490 are obtained.

Example 3

Two parts of the desacetylated lanata glucoside A prepared by treating the genuine lanata glucoside A with an alkali are dissolved in 800 parts of ethanol and mixed with 1,000 parts of fresh leaves of digitalis purpurea, which have been cut to small pieces. The obtained mixture is allowed to stand for 2-3 days, filtered and the residue exhausted with an ethanol-water mixture 1:1. The clear filtrate (about 3000 parts) is shaken three times with 3000 parts of ether each time and the ether solutions extracted with 600 parts of water. After formation of the layers, the etheric solution is separated and completely evaporated in vacuo. The remaining residue is dissolved in 2000 parts of a methanol—water mixture 1:1 and treated with an insoluble tannin-precipitating agent. The solution is filtered, the precipitate washed out and the obtained solution freed from methanol by evaporation in vacuo. Thereby a product that contains no glucose in the molecule crystallizes out. The glucoside obtained possesses similar properties to those of digitoxin.

In a similar manner it is possible to eliminate the glucose from the desacetylated lanata glucoside B and C, by means of the enzyme contained in the leaves of digitalis purpurea.

What we claim is:

1. A process for the manufacture of glucose-free glucosides, characterized in that cardio-active glucosides of digitalis containing glucose are subjected to the action of enzymes contained in digitalis plant.

2. A process for the manufacture of glucose-free glucosides, characterized in that cardio-active glucosides of digitalis containing glucose are subjected to the action of enzymes contained in digitalis plant in presence of water.

3. A process for the manufacture of glucose-free glucosides, characterized in that cardio-active glucosides of digitalis containing glucose are subjected to the action of enzymes contained in digitalis plant in presence of water and of an organic solvent miscible with water.

4. A process for the manufacture of glucose-free glucosides, characterized in that cardio-active glucosides of digitalis containing glucose are subjected to the action of enzymes contained in digitalis plant in presence of an aqueous solution of an organic solvent and of compounds selected from the group consisting of methanol, ethanol, ethyl-acetate, chloroform and toluene, which are able to kill the living cells of the fresh drug and to arrest putrefaction.

5. A process for the manufacture of glucose-free glucosides of digitalis, characterized in that fresh drugs containing the cardio-active glucosides of digitalis are subjected to the action of enzymes contained in digitalis plant in presence of an aqueous solution of an organic solvent and of compounds selected from the group consisting of methanol, ethanol, ethyl-acetate, chloroform and toluene, which are able to kill the living cells of the fresh drug and to arrest putrefaction.

6. A process for the manufacture of glucose-free glucosides of digitalis, characterized in that isolated cardio-active glucosides of digitalis are subjected to the action of enzymes contained in digitalis plant in presence of an aqueous solution of an organic solvent.

7. A process for the manufacture of glucose-free glucosides from digitalis, characterized in that digitalis glucosides containing glucose are subjected to the action of enzymes contained in digitalis plant in presence of an aqueous solution of an organic solvent.

8. A process for the manufacture of glucose-free glucosides from digitalis, characterized in that the genuine glucosides of digitalis lanata are subjected to the action of enzymes contained in digitalis plant in presence of an aqueous solution of an organic solvent.

9. A process for the manufacture of a new glucoside free from glucose, consisting in subjecting the genuine glucoside A from digitalis lanata to the action of an enzyme contained in digitalis lanata in presence of water.

10. A process for the manufacture of a new glucoside free from glucose, consisting in subjecting the genuine glucoside B from digitalis lanata to the action of an enzyme contained in digitalis lanata in presence of water.

11. A process for the manufacture of a new glucoside free from glucose, consisting in subjecting the genuine glucoside C from digitalis lanata to the action of an enzyme contained in digitalis lanata in presence of water.

12. The acetylated cardio-active digitalis glucosides free from glucose and possessing the general formula $$C_{43}H_{66}O_x + 4H_2O$$

wherein $x$ represents a whole number selected from the range 14–15, which are white products crystallized in form of rectangular plates, soluble in methanol and ethanol, and substantially insoluble in water, which yield on acid hydrolysis 46–47% of an aglucone, 54–55% of digitoxose and 7–7.5% of acetic acid and which are useful for therapeutical purposes.

13. Acetyl-digitoxin of the formula $$C_{43}H_{66}O_{14} + 4H_2O$$

which is a white product crystallized in form of rectangular plates, soluble in methanol and ethanol and substantially insoluble in water, which yields on acid hydrolysis 46–47% of digitoxigenin, 54–55% of digitoxose and 7–7.5% of acetic acid, which gives on treatment with dilute alkaline solutions digitoxin and sodium acetate and which can be used for therapeutical purposes.

14. Acetyl-gitoxin of the formula $$C_{43}H_{66}O_{15} + 4H_2O$$

which is a white product crystallized in form of rectangular plates, soluble in ethanol and methanol and substantially insoluble in water, which yields on acid hydrolysis 46–47% of gitoxigenin, 54–55% of digitoxose and 7–7.5% of acetic acid, which gives on treatment with dilute alkaline solutions gitoxin and sodium acetate and which can be used for therapeutical purposes.

15. Acetyl-digoxin of the formula $$C_{43}H_{66}O_{15} + 4H_2O$$

which is a white product crystallized in form of rectangular plates, soluble in ethanol and methanol and substantially insoluble in water, which yields on acid hydrolysis 46–47% of digoxigenin, 54–55% of digitoxose and 7–7.5% of acetic acid, which gives on treatment with dilute alkaline solutions digoxin and sodium acetate and which can be used for therapeutical purposes.

ARTHUR STOLL.
WALTER KREIS.
ALBERT HOFMANN.